(12) United States Patent
Nam

(10) Patent No.: US 10,810,500 B2
(45) Date of Patent: Oct. 20, 2020

(54) APPARATUS AND METHOD FOR DETERMINING ENERGY CONSERVATION MEASURE FOR BUILDING RETROFIT

(71) Applicant: ELECTRONICS AND TELECOMMUNICATIONS RESEARCH INSTITUTE, Daejeon (KR)

(72) Inventor: Hong-Soon Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 696 days.

(21) Appl. No.: 15/658,592

(22) Filed: Jul. 25, 2017

(65) Prior Publication Data

US 2018/0307989 A1 Oct. 25, 2018

(30) Foreign Application Priority Data

Apr. 20, 2017 (KR) .................. 10-2017-0050737

(51) Int. Cl.
*G06N 5/04* (2006.01)
*G06N 7/00* (2006.01)
*G06Q 50/06* (2012.01)

(52) U.S. Cl.
CPC .............. *G06N 5/04* (2013.01); *G06N 7/00* (2013.01); *G06Q 50/06* (2013.01)

(58) Field of Classification Search
CPC ...................... G05B 2219/2639; F24F 11/46
USPC ................................................. 706/15, 45
See application file for complete search history.

(56) References Cited

U.S. PATENT DOCUMENTS

| | | | |
|---|---|---|---|
| 2007/0244604 A1 | 10/2007 | McNally | |
| 2010/0286937 A1* | 11/2010 | Hedley | G06Q 50/06 702/60 |
| 2011/0246381 A1* | 10/2011 | Fitch | G06Q 50/06 705/313 |

(Continued)

FOREIGN PATENT DOCUMENTS

| | | |
|---|---|---|
| KR | 10-2015-0020943 A | 2/2015 |
| KR | 10-2015-0128163 A | 11/2015 |

OTHER PUBLICATIONS

Sun-Sook Kim et al., "Development of integrated building energy performance support system for disseminating and spreading low energy buildings," Korean Institute of Architectural Sustainable Environment and Building Systems, vol. 10, No. 3, pp. 24-32, Jul. 2016.

(Continued)

*Primary Examiner* — David R Vincent
(74) *Attorney, Agent, or Firm* — LRK Patent Law Firm

(57) ABSTRACT

A method and apparatus for determining an Energy Conservation Measure (ECM) for building retrofit. An analysis apparatus receives a condition for building retrofit, and selects detailed measures of one or more Energy Conservation Measures (ECMs) for a building based on the condition. The analysis apparatus selects a maximum of one detailed measure from among multiple detailed measures of each of the one or more ECMs. The analysis apparatus provides one or more ECM determination schemes, which include an energy savings-based ECM determination scheme and a cost-based ECM determination scheme.

18 Claims, 9 Drawing Sheets

(56) References Cited

U.S. PATENT DOCUMENTS

| | | |
|---|---|---|
| 2013/0124250 A1* | 5/2013 | Crawley .......... G06Q 10/06313 |
| | | 705/7.23 |
| 2013/0124251 A1 | 5/2013 | Lee et al. |
| 2013/0144546 A1 | 6/2013 | Brackney et al. |
| 2014/0107851 A1 | 4/2014 | Yoon et al. |
| 2014/0278280 A1* | 9/2014 | Pardo-Fernandez .... G06F 30/13 |
| | | 703/1 |
| 2015/0323948 A1 | 11/2015 | Jeong et al. |
| 2016/0216721 A1* | 7/2016 | Michalski ................ F24F 11/30 |
| 2016/0352125 A1 | 12/2016 | Choi et al. |

OTHER PUBLICATIONS

Reuven Cohen et al., "Multi-Dimensional OFDMA Scheduling in a Wireless Network with Relay Nodes," IEEE INFOCOM'14, 2014.
E. Pikas et al., "Cost optimal and nearly zero energy building solutions for office buildings," Energy and Buildings, 2014.

* cited by examiner

DETAILED MEASURES OF
ECMS FOR OUTER WALL

| U-VALUE [W/m²K] | THICKNESS [mm] | COST [$/m²] | |
|---|---|---|---|
| 0.20 | 150 | 147.75 | $d_{1,1}$ |
| 0.16 | 200 | 197.75 | $d_{1,2}$ |
| 0.13 | 250 | 256.64 | $d_{1,3}$ |
| 0.11 | 300 | 311.15 | $d_{1,4}$ |
| 0.09 | 350 | 409.23 | $d_{1,5}$ |

CURRENT THERMAL TRANSMITTANCE 0.16

FIG. 2A

DETAILED MEASURES OF ECMS FOR
WINDOWS AND DOORS

CURRENT THERMAL TRANSMITTANCE 1.10 →

| U-VALUE [W/m²K] | TYPE | COST [$/m²] | |
|---|---|---|---|
| 1.40 | 2/Air | 124.45 | $d_{4,1}$ |
| 1.10 | 2/Arg | 132.33 | $d_{4,2}$ |
| 1.10 | 3/Air | 132.66 | $d_{4,3}$ |
| 0.54 | 3/Arg | 137.39 | $d_{4,4}$ |
| 0.32 | 4/Kry | 214.03 | $d_{4,5}$ |
| 0.24 | 5/Kry | 301.51 | $d_{4,6}$ |

FIG. 2B

ECMS AND DETAILED MEASURES OF ECMS

| ECM NAME ($e_i$) | DETAILED MEASURE ($d_{i,j}$) | |
|---|---|---|
| | ENERGY SAVINGS [kWh] | COST [$] |
| OUTER WALL ($e_1$) | 0 ($S_{1,1}$) | 100000 ($C_{1,1}$) |
| | 0 ($S_{1,2}$) | 100000 ($C_{1,2}$) |
| | 2700 ($S_{1,3}$) | 1500 ($C_{1,3}$) |
| | 2900 ($S_{1,4}$) | 1750 ($C_{1,4}$) |
| | 3400 ($S_{1,5}$) | 2000 ($C_{1,5}$) |
| ROOF ($e_2$) | ... | ... |
| | | |
| FLOOR ($e_3$) | ... | ... |
| | | |
| WINDOWS AND DOORS ($e_4$) | 0 ($S_{4,1}$) | 100000 ($C_{4,1}$) |
| | 0 ($S_{4,2}$) | 100000 ($C_{4,2}$) |
| | 0 ($S_{4,3}$) | 100000 ($C_{4,3}$) |
| | 270 ($S_{4,3}$) | 150 ($C_{4,4}$) |
| | 290 ($S_{4,4}$) | 175 ($C_{4,5}$) |
| | 340 ($S_{4,5}$) | 200 ($C_{4,6}$) |

FIG. 2C

APPARATUS AND METHOD FOR DETERMINING ENERGY CONSERVATION MEASURE FOR BUILDING RETROFIT

CROSS REFERENCE TO RELATED APPLICATION

This application claims the benefit of Korean Patent Application No. 10-2017-0050737, filed Apr. 20, 2017, which is hereby incorporated by reference in its entirety into this application.

BACKGROUND OF THE INVENTION

1. Technical Field

The following embodiments relate generally to an apparatus and method for retrofitting a building and, more particularly, to an apparatus and method for determining an energy conservation measure for building retrofit.

2. Description of the Related Art

Globally, the energy consumed by buildings occupies about 35% of all energy consumption. Further, the cost of energy consumed by buildings accounts for about 30% of all building management costs.

For this reason, reducing the amount of energy consumed by buildings is an important problem related to worldwide issues, such as global warming and the exhaustion of energy resources, as well as cost reduction.

Existing systems for calculating energy and cost savings have been configured to estimate an Energy Conservation Measure (ECM) suitable for each building and calculate energy and cost savings based on the estimated ECM.

Methods for determining an ECM may include a method for allowing a user to personally determine an ECM after the energy performance of a building has been evaluated and a method for allowing an evaluation system to detect parts that exhibit low performance, among parts related to energy consumption by the building, and recommend an ECM required to improve the detected low-performance parts.

However, when these methods are used, the number of combinations of selectable ECMs is excessively large, and thus a problem arises in that it is difficult to find an optimal ECM set. A problem also arises in that, in addition to the object of improving the energy performance of a building, the size of an available budget or the extent of savings to be targeted is not taken into consideration.

As ECMs for improving the energy performance of a building, there are a large number of methods, such as 1) the replacement of equipment having low energy efficiency, 2) the addition of new equipment, and 3) the improvement of users' usage behavior.

In building retrofit, one or more of various available ECMs are determined. One or more ECMs to be used may be regarded as subsets of all ECMs. Here, the total number of possible subsets may be a power set of the total number of ECMs. In other words, the total number of possible subsets increases exponentially according to the total number of ECMs.

For example, when the number of ECMs is m, the number of combinations of ECMs may be $2^m$. The calculation of such multiple combinations takes a lot of time even if a high-performance computer is used.

Further, various detailed measures may be present for each ECM. However, each ECM may be implemented by one of its multiple detailed measures. That is, multiple detailed measures for one ECM cannot be duplicately selected, and no detailed measures may be selected, or, alternatively, only one detailed measure may be selected from among detailed measures.

If the problem of duplication of detailed measures is not taken into consideration and is simplified merely by determining whether to select each ECM, the solution to this problem may be implemented using an existing knapsack algorithm.

However, when using the existing knapsack algorithm, it is difficult to implement a solution that has multiple detailed measures for each ECM while simultaneously guaranteeing the exclusion of duplicate selection of multiple detailed measures.

PRIOR ART DOCUMENTS

Patent Documents (Patent Document 1) Korean Patent Application Publication No. 2015-0020943, Date of Filing: Aug. 19, 2013 (entitled "Method for Existing Building Energy Performance Retrofit Using Building Energy Simulation Model and Bayesian Calibration")

SUMMARY OF THE INVENTION

An embodiment is intended to provide an apparatus and method for determining ECMs so that energy savings is maximized within the range of costs presented to retrofit a building.

An embodiment is intended to provide an apparatus and method for determining ECMs so that costs are minimized while energy savings required in order to retrofit a building are satisfied.

An embodiment is intended to provide an apparatus and method for analyzing cost reduction and energy saving effects resulting from determined ECMs.

An embodiment is intended to provide an apparatus and method for solving a problem in that the number of combinations of multiple ECMs is excessively large.

An embodiment is intended to provide an apparatus and method for determining an optimal combination, among various possible combinations of ECMs.

An embodiment is intended to provide an apparatus and method for providing the reduction of energy consumption, the reduction of energy costs of a building, and the reduction of $CO_2$ emissions by selecting ECMs.

An embodiment is intended to provide an apparatus and method for providing information, such as a list of selected ECMs, initial installation costs of the selected ECMs, energy savings by the selected ECMs, and a payback period for costs attributable to the selected ECMs.

An embodiment is intended to provide an apparatus and method for facilitating planning, design and management of building retrofit by providing information.

An embodiment is intended to provide an apparatus and method for determining an optimized combination of items separated into groups.

In accordance with an aspect to accomplish the above objects, there is provided an analysis apparatus, including an input unit for receiving a condition for building retrofit; and a processing unit for selecting detailed measures of one or more Energy Conservation Measures (ECMs) for a building based on the condition, wherein, each of the one or more ECMs, the processing unit selects a maximum of one detailed measure from among multiple detailed measures of the corresponding ECM.

The processing unit may select one of multiple ECM determination schemes, and select the detailed measures of the one or more ECMs depending on the selected ECM determination scheme.

The analysis apparatus may further include an output unit for outputting results of analysis of the detailed measures of the one or more ECMs.

The results of the analysis may include costs estimation based on the selected detailed measures of the one or more ECMs, a list of the detailed measures of the one or more ECMs, and energy savings estimation based on the selected detailed measures of the one or more ECMs.

The processing unit may select the detailed measures of the one or more ECMs depending on a user ECM determination scheme.

The user ECM determination scheme may be a scheme for allowing a user of the analysis apparatus to select the detailed measures of the one or more ECMs.

The processing unit may select the detailed measures of the one or more ECMs depending on an energy savings-based ECM determination scheme.

The condition may be required energy savings.

The energy savings-based ECM determination scheme may be a scheme for allowing the processing unit to select the detailed measures of the one or more ECMs such that the required energy savings is satisfied.

The processing unit may select the detailed measures of the one or more ECMs depending on a cost-based ECM determination scheme.

The condition may be a cost limitation.

The cost-based ECM determination scheme may be a scheme for allowing the processing unit to select the detailed measures of the one or more ECMs such that the cost limitation is not exceeded.

An allowable range may be applied to the cost limitation.

The processing unit may select the detailed measures of the one or more ECMs within the allowable range of the cost limitation.

The processing unit may select one or more candidate detailed measures from among all available detailed measures, generate a candidate detailed measure list for the one or more candidate detailed measures, and select the detailed measures of the one or more ECMs from among the one or more candidate detailed measures by applying a group knapsack algorithm to the candidate detailed measure list.

The processing unit may calculate cost-effectiveness values of the one or more candidate detailed measures, and sort entities in the candidate detailed measure list in descending order of cost-effectiveness.

The processing unit may be configured to, for each of all ECMs, search for a detailed measure having energy savings higher than an energy savings of a current detailed measure of the corresponding ECM.

The processing unit may add the found detailed measure to the candidate detailed measure list if a cost of the found detailed measure is less than or equal to the cost limitation.

The found detailed measure may include one or more detailed measures.

The processing unit may eliminate, from the one or more detailed measures, a detailed measure that has a cost equal to or greater than those of remaining detailed measures and has an energy savings less than or equal to those of the remaining detailed measures.

The processing unit may configure a dynamic programming table for the one or more candidate detailed measures which are sorted in descending order of cost-effectiveness, thus selecting the detailed measures of the one or more ECMs from among the one or more candidate detailed measures.

The table may be configured using a method based on a knapsack algorithm, the method being configured such that two or more of multiple candidate detailed measures for one same ECM are not included in one row of the table.

The processing unit may be configured to, before adding a certain candidate detailed measure to a current row of the table, check whether a same-ECM candidate detailed measure is present in a row previous to the current row, and determine which one of the certain candidate detailed measure and the same-ECM candidate detailed measure is to be added to the current row if the same-ECM candidate detailed measure is found to be present in the previous row.

An ECM of the same-ECM candidate detailed measure may be same to an ECM of the certain candidate detailed measure.

If the same-ECM candidate detailed measure may be found to be present, the processing unit may determine whether to include the certain candidate detailed measure in the current row by applying a knapsack algorithm to the certain candidate detailed measure.

The processing unit may add the certain candidate detailed measure to the current row if the same-ECM candidate detailed measure is included at a location, corresponding to a difference between a cost of the certain candidate detailed measure and a cost of the same-ECM candidate detailed measure, in the previous row and if energy savings is improved when the same-ECM candidate detailed measure is replaced with the certain candidate detailed measure.

The processing unit may determine candidate detailed measures included in the current row to be the detailed measures of the one or more ECMs if a sum of costs of candidate detailed measures included in the current row is same to the cost limitation.

The same-ECM candidate detailed measure may include one or more same-ECM candidate detailed measures.

The one or more same-ECM candidate detailed measures may be targets to be compared with the certain candidate detailed measure in reverse order relative to an order of candidate detailed measures in the candidate detailed measure list.

In accordance with another aspect to accomplish the above objects, there is provided an analysis method, including receiving a cost limitation for building retrofit; and selecting detailed measures of one or more ECMs for a building based on the cost limitation, wherein, for each of the one or more ECMs, a maximum of one detailed measure is selected from among multiple detailed measures of the corresponding ECM.

In accordance with a further aspect to accomplish the above objects, there is provided an analysis method, including receiving required energy savings for building retrofit; and selecting detailed measures of one or more ECMs for a building based on the required energy savings, wherein, for each of the one or more ECMs, a maximum of one detailed measure is selected from among multiple detailed measures of the corresponding ECM.

In addition, there are provided other methods, apparatuses, and systems for implementing the present disclosure, and a computer-readable storage medium storing a computer program for executing the method.

BRIEF DESCRIPTION OF THE DRAWINGS

FIGS. 2A, 2B, and 2C illustrate the types of ECMs and one or more detailed measures of each ECM according to an embodiment;

FIG. 2A illustrates a database (DB) for ECMs for improving the thermal transmittance of an outer wall;

FIG. 2B illustrates a DB for ECMs for improving the thermal transmittance of windows and doors;

FIG. 2C illustrates detailed measures of ECMs;

DESCRIPTION OF THE PREFERRED EMBODIMENTS

Figure 1:
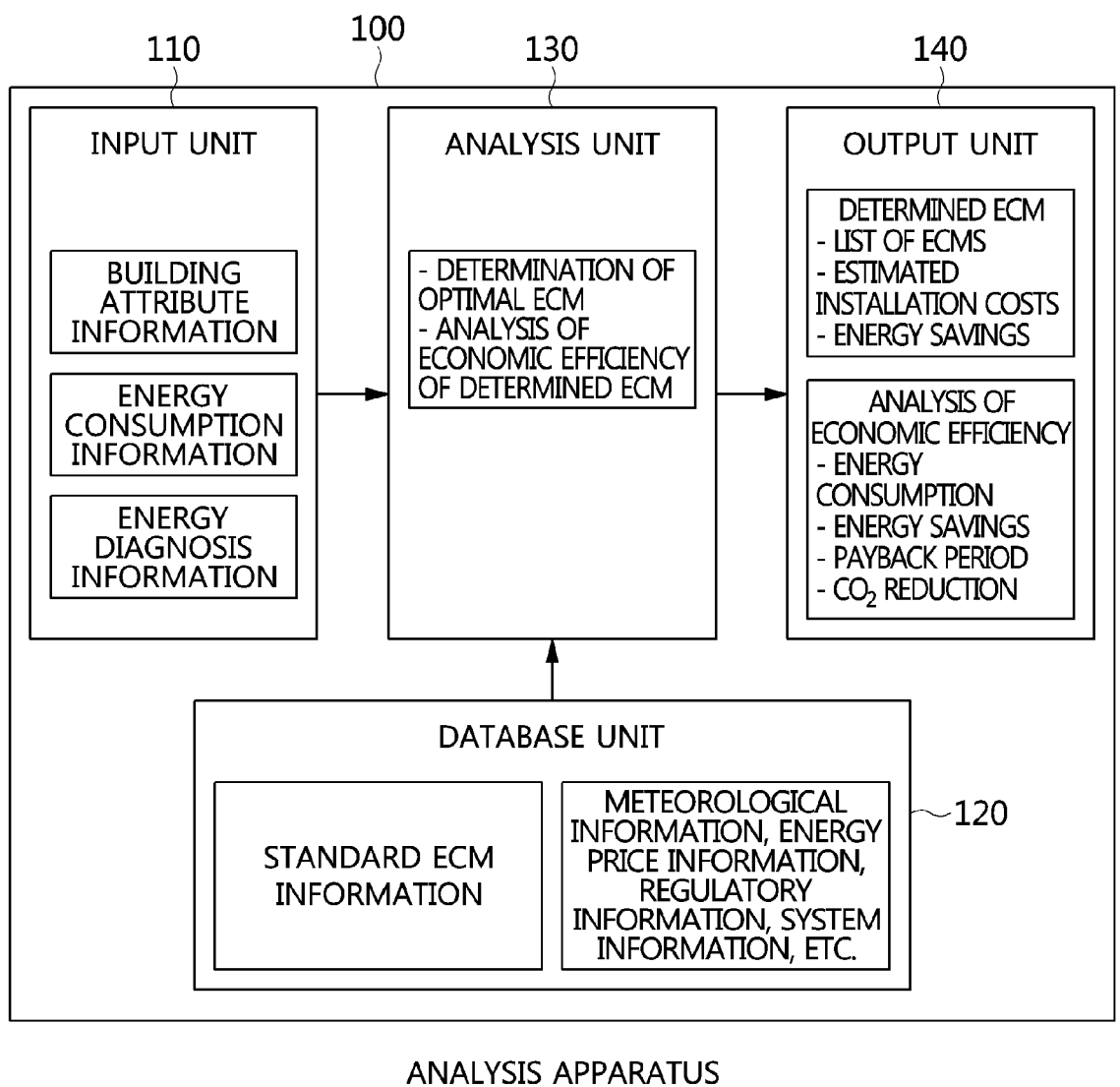
FIG. 1 is a configuration diagram of an analysis apparatus according to an embodiment.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that various embodiments are different from each other, but do not need to be mutually exclusive to each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

The terms used in the present specification are merely used to describe specific embodiments and are not intended to limit the present disclosure. A singular expression includes a plural expression unless a description to the contrary is specifically pointed out in context. In the present specification, it should be understood that terms such as "comprises" or "comprising" are merely intended to indicate that features, numbers, steps, operations, components, parts, or combinations thereof are present, and are not intended to exclude the possibility that one or more other features, numbers, steps, operations, components, parts, or combinations thereof will be present or added, and additional components may be included in the scope of the practice of exemplary embodiments or the technical spirit of the exemplary embodiments. It will be understood that when a component is referred to as being "connected" or "coupled" to another component, it can be directly connected or coupled to the other component, or intervening components may be present. Further, it should be noted that, in exemplary embodiments, the expression describing that a component "comprises" a specific component means that additional components may be included in the scope of the practice or the technical spirit of exemplary embodiments, but do not preclude the presence of components other than the specific component.

Also, components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, some components are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted.

In the following embodiments, a new type of algorithm that prevents detailed measures of a single ECM from being duplicately selected is proposed. It may be difficult to solve the problem of duplicate selection of detailed measures using only existing schemes, such as a knapsack algorithm.

Hereinafter, terms "detailed measure" and "detailed implementation measure" may have the same meaning and may be interchangeably used with each other.

Algorithms proposed in embodiments may recommend an optimal ECM that maximizes energy savings within the range of an imposed cost limitation or may recommend the lowest-cost ECM that satisfies the energy savings or savings rate required by a user.

Apparatuses and methods disclosed in the following embodiments may provide the following functions 1) to 5).

1) User-determination scheme for allowing the user to personally select ECMs and detailed measures of the ECMs 2) Cost-based ECM determination scheme for selecting (optimal) ECMs and detailed measures of the ECMs based on costs to maximize energy savings relative to an imposed cost limitation 3) Energy savings-based ECM determination scheme for selecting (optimal) ECMs and detailed measures of the ECMs based on energy savings required in order to satisfy specific energy savings or a specific savings effect using the lowest cost or as low a cost as possible 4) Calculation related to items, such as a list of the selected ECMs and selected detailed measures of the selected ECMs, initial investment costs, energy savings, energy cost savings, and a payback period 5) Presentation of the calculated items to the user FIG. 1 is a configuration diagram of an analysis apparatus according to an embodiment.

An analysis apparatus 100 may determine an optimal ECM that satisfies each of conditions for building retrofit depending on the conditions for building retrofit and may evaluate the economic efficiency of the determined ECM.

Further, the analysis apparatus 100 may analyze the energy performance of the building, may determine an optimal ECM that is within analyzed energy performance and cost limitations, and may analyze the economic efficiency of the determined ECM. In this light, the analysis apparatus 100 may be regarded as a system for determining an optimal ECM and evaluating economic efficiency.

The analysis apparatus 100 may include an input unit 110, a database (DB) unit 120, an analysis unit 130, and an output unit 140.

The input unit 110 may receive building data.

The building data may include building attribute information about the attributes of the building, energy consumption information about the amount of energy used by the building, energy diagnosis information about the diagnosis of energy consumption by the building, etc.

The building attribute information may include general details information about general details of the building, energy facility information about the energy facilities of the building, etc.

The energy consumption information may contain energy consumption for each predefined period. For example, the predefined period may be one or more of the week, month, and year.

The energy diagnosis information may contain surveyed data and facility efficiency information related to the energy facilities of the building.

The DB unit 120 may store and manage ECM data.

The DB unit 120 may provide standard ECM data information, meteorological information, energy price information, regulatory information, energy system information, etc.

The analysis unit 130 may determine an optimal ECM and analyze the economic efficiency of the ECM.

The analysis unit 130 may provide 1) a user-ECM determination scheme, 2) a cost-based ECM determination scheme, and 3) an energy savings-based ECM determination scheme. Which one of the schemes is to be used may be determined based on the requirements of the user.

The user ECM determination scheme may be a scheme for allowing the user to personally select an ECM.

In the user ECM determination scheme, the user may select a specific type of ECM from a standard ECM DB. Alternatively, in the scheme for allowing the user to personally determine the ECM, the user may personally enter a required ECM.

The cost-based ECM determination scheme may be a scheme for determining an ECM so that, when a cost limitation is imposed, energy savings and/or energy cost savings are maximized using the imposed cost limitation.

The energy savings-based ECM determination scheme may be a scheme for determining an ECM so that the cost is minimized while savings required by the user are satisfied.

The determined ECMs may be optimal ECMs under respective given conditions.

The output unit 140 may output the results of analysis.

The output unit 140 may provide information about respective determined ECMs and the results of analysis of economic efficiency of the determined ECMs.

The information about ECMs may contain a list of ECMs, estimated installation costs, estimated energy savings, etc.

The results of analysis of economic efficiency may contain energy consumption, energy savings, a payback period, $CO_2$ reduction, etc.

FIGS. 2A, 2B, and 2C illustrate the types of ECMs and one or more detailed measures of each ECM according to an embodiment.

FIG. 2A illustrates an example of a DB for an ECM for improving the thermal transmittance of an outer wall.

In FIG. 2A, five detailed measures of the ECM for improving the thermal transmittance of the outer wall are presented.

Each of the five detailed measures may have thermal transmittance, thickness, and cost. The dimensions of the thermal transmittance, thickness, and cost may be "$W/m^2K$", "mm" and "$/m^2$".

A U-value may indicate the unit of the thermal transmittance of the outer wall.

$d_{i,j}$ may denote a detailed measure j of ECM i. For example, $d_{1,3}$ may indicate detailed measure 3, which is a third detailed measure of ECM 1, which is a first ECM.

The ECM for the outer wall may be ECM 1, and the detailed measures of ECM 1 may include detailed measure 1 to detailed measure 5.

It can be seen that, for the ECM for the outer wall, detailed measure 2 is currently selected, wherein the current thermal transmittance may be 0.16.

FIG. 2B illustrates an example of a DB for an ECM for improving the thermal transmittance of windows and doors.

In FIG. 2B, six detailed measures of the ECM for improving the thermal transmittance of windows and doors are presented.

Each of the six detailed measures may have thermal transmittance, type, and cost. The dimensions of the thermal transmittance and cost may be "$W/m^2K$" and "$/m^2$", respectively.

A U-value may indicate the unit of the thermal transmittance of windows and doors.

The types of windows and doors may be "2/Air", "2/Arg", "3/Air", "3/Arg", "4/Kry", "5/Kry", etc.

The ECM for the windows and doors may be ECM 4, and detailed measures of ECM 4 may include detailed measure 1 to detailed measure 6.

It can be seen that, for the ECM for the windows and doors, detailed measure 3 is currently selected, wherein the current thermal transmittance may be 1.10.

FIG. 2C illustrates detailed measures of ECMs.

As shown in FIG. 2C, ECMs for building retrofit may include various types, such as construction, facility, lighting, and new renewable ECMs. Various types of ECMs may be independent of each other, and each of the ECMs may have one or more detailed measures.

Referring to FIG. 2A, the current thermal transmittance of the ECM for the outer wall may be 0.16. When the current thermal transmittance is 0.16, detailed measures capable of improving the thermal transmittance may be three detailed measures $d_{1,3}$, $d_{1,4}$, and $d_{1,5}$.

Referring to FIG. 2B, the current thermal transmittance of the ECM for windows and doors may be 1.10. When the current thermal transmittance is 1.10, the detailed measures capable of improving the thermal transmittance may be three detailed measures $d_{4,4}$, $d_{4,5}$, and $d_{4,6}$.

The analysis unit 130 may calculate the energy savings $s_{i,j}$ and cost $c_{i,j}$ of the corresponding building using the above-described DBs. Here, the cost may be the installation cost.

The dimension units of energy savings and cost may be "kWh" and "$", respectively.

$s_{i,j}$ may be the energy savings resulting from $d_{i,j}$. $s_{i,j}$ may indicate the amount of energy saved as the selected detailed measure of ECM i has changed from the current detailed measure to detailed measure j of ECM i. In other words, $s_{i,j}$ may be the difference between the energy performance of the detailed measure j of ECM i and the energy performance of the current detailed measure of ECM i.

$c_{i,j}$ may be an additional cost resulting from $d_{i,j}$. The cost may be the installation cost. $c_{i,j}$ may be the cost that is added as the selected detailed measure of ECM i has changed from the current detailed measure to the detailed measure j of ECM i. In other words, $c_{i,j}$ may be the difference between the cost of the detailed measure j of ECM i and the cost of the current detailed measure of ECM i.

The added cost may be calculated based on the location, size, and purpose of the corresponding building.

Depending on the circumstances, $s_{i,j}$ and $c_{i,j}$ may have negative values. For example, the energy savings of the detailed measure j may be less than or equal to the energy savings of the current detailed measure.

For the convenience of calculation or the like, when the energy savings of the detailed measure j is less than or equal to the energy savings of the current detailed measure, the energy savings may be set to 0 (kWh) instead of a negative value. Further, for the convenience of calculation, when the cost of the detailed measure j is less than or equal to the cost of the current detailed measure, the added cost may be set to a sufficiently large value instead of a negative value. In FIG. 2C, the sufficiently large value is exemplified as "100000".

The analysis unit 130 may define energy savings $s_{i,j}$ and additional installation cost $c_{i,j}$, which correspond to $d_{i,j}$, according to the above-described scheme.

In FIG. 2C, $e_i$ may denote ECM i. In FIG. 2C, ECMs for an outer wall, a roof, floor, and windows and doors are illustrated. Detailed measures of the ECMs for the roof and the floor are omitted.

In building retrofit, the number of ECMs is not limited, but the detailed measures may be selected such that, for each ECM, a maximum of one detailed measure must be able to be selected.

Figure 3:
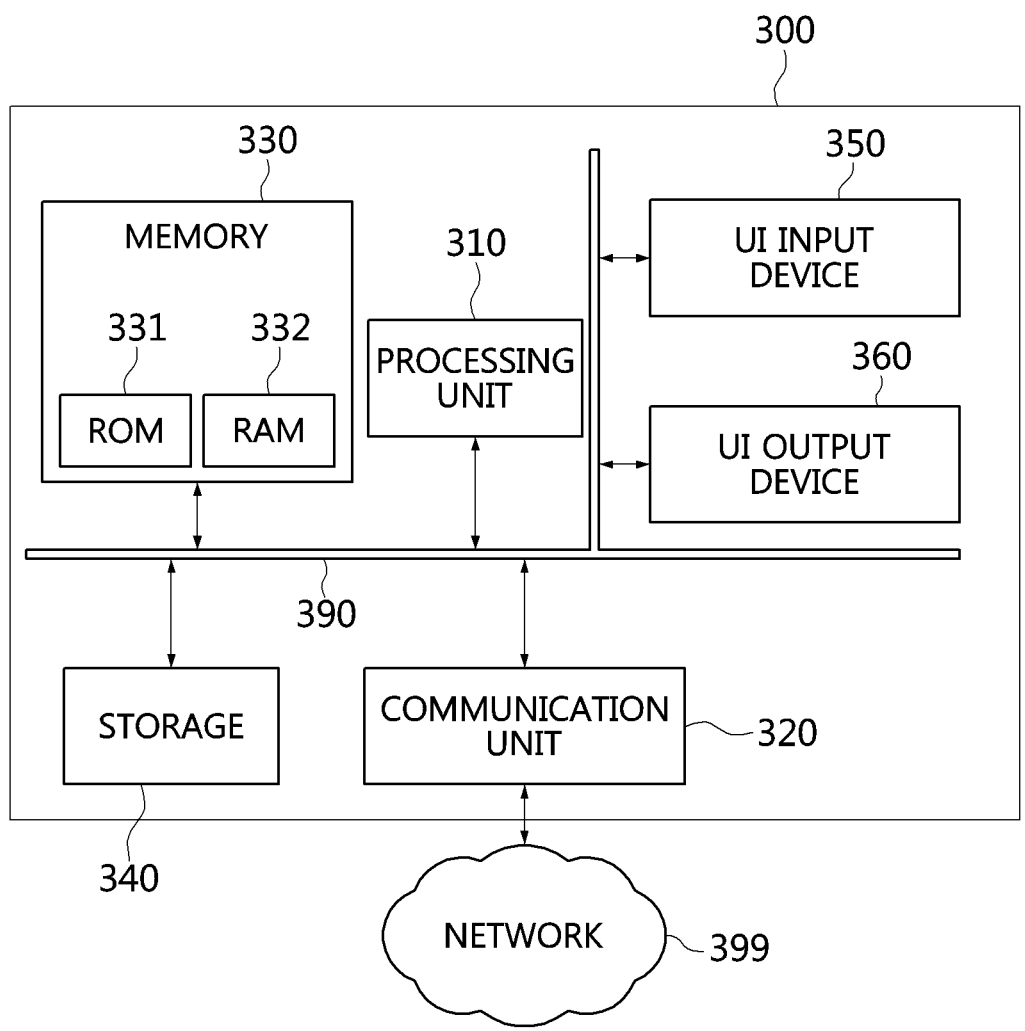
FIG. 3 illustrates an electronic device in which an analysis apparatus according to an embodiment is implemented.

FIG. 3 is a diagram illustrating an electronic device in which the analysis apparatus according to an embodiment is implemented.

The analysis apparatus 100 may be implemented as the electronic device 300 shown in FIG. 3. The electronic device 300 may be a general-purpose computer system functioning as the analysis apparatus 100.

As shown in FIG. 3, the electronic device 300 may include at least some of a processing unit 310, a communication unit 320, memory 330, storage 340, and a bus 390. The components of the electronic device 300, such as the processing unit 310, the communication unit 320, the memory 330, and the storage 340, may communicate with each other through the bus 390.

The processing unit 310 may be a semiconductor device for executing processing instructions stored in the memory 330 or the storage 340. For example, the processing unit 310 may be at least one processor.

The processing unit 310 may process tasks required for the operation of the electronic device 300. The processing unit 310 may execute code in the operations or steps of the processing unit 310, which will be described later in connection with embodiments.

The processing unit 310 may perform the generation, storage, and output of information, which will be described in connection with the following embodiments, and may perform operations at other steps performed by the electronic device 300.

The processing unit 310 may correspond to the analysis unit 130.

The communication unit 320 may be connected to a network 399. The communication unit 320 may receive data or information required for the operation of the electronic device 300, and may transmit data or information required for the operation of the electronic device 300. The communication unit 320 may transmit data to other devices and receive data from other devices over the network 399. For example, the communication unit 320 may be a network chip or a port.

The communication unit 320 may correspond to the input unit 110. For example, the communication unit 320 may receive building data.

The communication unit 320 may correspond to the output unit 140. For example, the communication unit 320 may transmit the results of analysis to other devices or the like.

Each of the memory 330 and the storage 340 may be any of various types of volatile or nonvolatile storage media. For example, the memory 330 may include at least one of Read Only Memory (ROM) 331 and Random Access Memory (RAM) 332. The storage 340 may include an embedded storage medium, such as RAM, flash memory, or a hard disk, and may include a removable storage medium, such as a memory card.

The function or operation of the electronic device 300 may be performed as the processing unit 310 executes at least one program module. The memory 330 and/or the storage 340 may store at least one program module. The at least one program module may be configured to be executed by the processing unit 310.

The storage 340 may correspond to the DB unit 120.

The storage 340 may store information, data, lists, etc.

The electronic device 300 may further include a User Interface (UI) input device 350 and a UI output device 360. The UI input device 350 may receive the input of the user required for the operation of the electronic device 300. The UI output device 360 may output information or data related to the operation of the electronic device 300.

The UI input device 350 may correspond to the input unit 110. For example, the UI input device 350 may receive the input of building data.

The UI output device 360 may correspond to the output unit 140. For example, the UI output device 360 may output the results of analysis.

Figure 4:
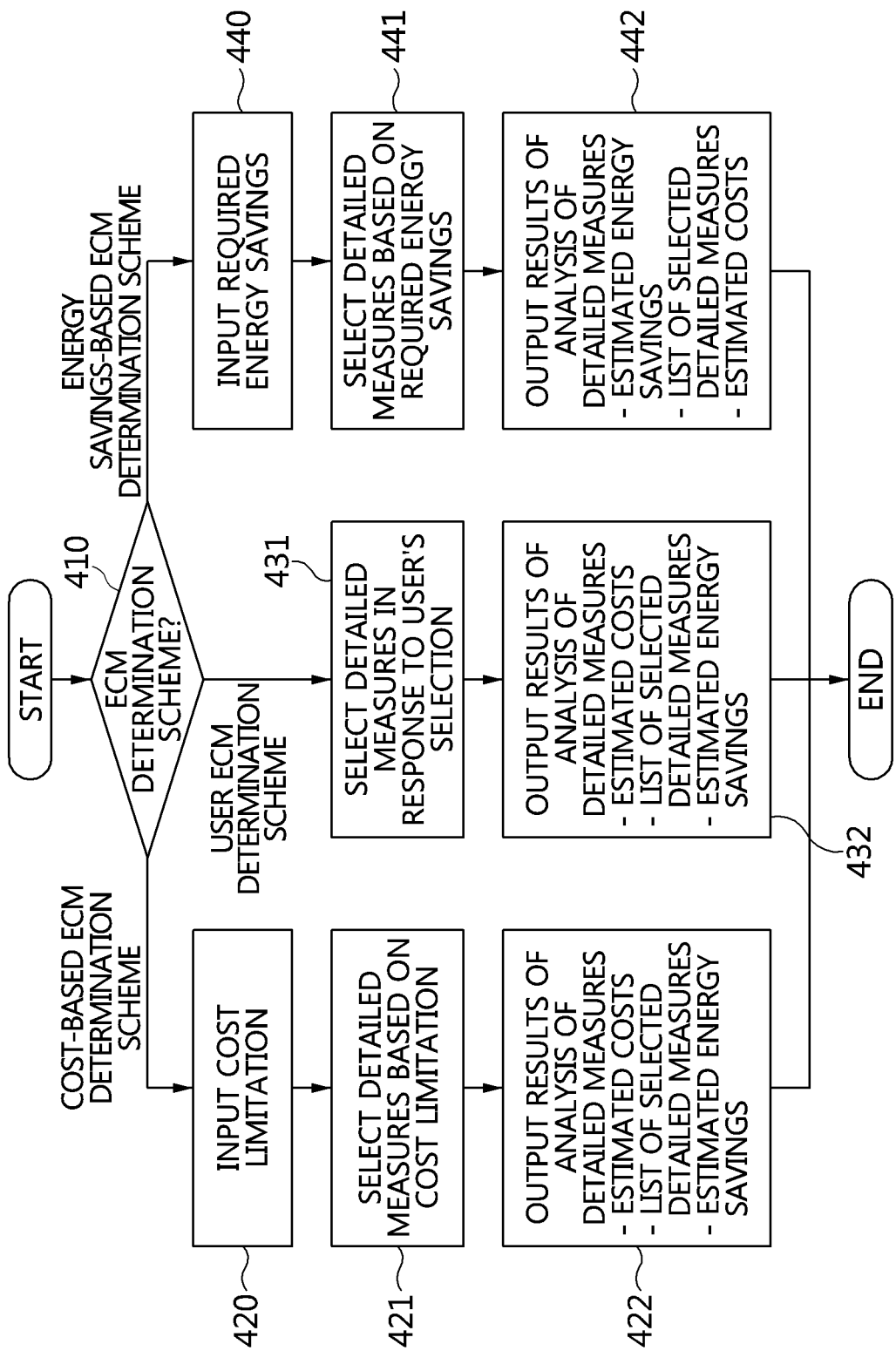
FIG. 4 is a flowchart of an analysis method according to an embodiment.

FIG. 4 is a flowchart of an analysis method according to an embodiment.

The analysis method in the flowchart of FIG. 4 may be a method for determining an optimal ECM and evaluating the economic efficiency of the determined ECM.

At step 410, the processing unit 310 may select an ECM determination scheme.

The processing unit 310 may select any one of multiple ECM determination schemes. The multiple ECM determination schemes may include a cost-based ECM determination scheme, a user ECM determination scheme, and an energy savings-based ECM determination scheme.

The cost-based ECM determination scheme may be a scheme for allowing the processing unit 310 to select detailed measures of one or more ECMs so that a cost limitation is not exceeded.

The user ECM determination scheme may be a scheme for allowing the user of the analysis apparatus 100 to select detailed measures of one or more ECMs.

The energy savings-based ECM determination scheme may be a scheme for allowing the processing unit 310 to select detailed measures of one or more ECMs so that required energy savings is satisfied.

Hereinafter, the processing unit 310 may select detailed measures of one or more ECMs depending on the selected ECM determination scheme.

When the selected ECM determination scheme is the cost-based ECM determination scheme, step 420 may be performed.

For example, when the cost-based ECM determination scheme is selected by the user, a cost limitation may be input at step 420, and a procedure corresponding to the cost-based ECM determination scheme may be performed based on the input cost limitation at step 421. The effects of improvement of one or more ECMs and detailed measures that are selected depending on the cost-based ECM determination scheme may be analyzed, and the results of the analysis may be output at step 422.

The cost limitation may be a budget available for retrofitting the building.

When the selected ECM determination scheme is the user ECM determination scheme, step 431 may be performed.

For example, when the user ECM determination scheme is selected by the user, a procedure corresponding to the user ECM determination scheme may be performed in response to the user's selection at step 431. The effects of improvement of one or more ECMs and detailed measures that are selected by the user may be analyzed, and the results of the analysis may be output at step 432.

When the selected ECM determination scheme is the energy savings-based ECM determination scheme, step 440 may be performed.

For example, when the energy savings-based ECM determination scheme is selected by the user, required energy savings may be input at step 440. A procedure corresponding to the energy savings-based ECM determination scheme may be performed depending on the required energy savings at step 441. The effects of improvement of one or more ECMs and detailed measures that are selected depending on the energy savings-based ECM determination scheme may be analyzed, and the results of the analysis may be output at step 442.

At steps 420 and 440, the input unit 110, the communication unit 320 or the UI input device 350 may receive each condition for building retrofit.

When the selected ECM determination scheme is the cost-based ECM determination scheme, the condition may be a cost limitation.

When the selected ECM determination scheme is the energy savings-based ECM determination scheme, the condition may be required energy savings.

At step 420, the cost limitation may be input. The input unit 110, the communication unit 320 or the UI input device 350 may receive the cost limitation.

Here, the cost may be either an installation cost or an installation budget.

At step 440, the required energy savings may be input. The input unit 110, the communication unit 320 or the UI input device 350 may receive the required energy savings.

At steps 421, 431 and 441, the processing unit 310 may select detailed measures of one or more ECMs based on a given condition. The given condition may be any one of 1) cost limitation, 2) selection by the user, and 3) required energy savings.

The processing unit 310 may select, for each of the one or more ECMs, a maximum of one detailed measure from among multiple detailed measures of the corresponding ECM. In other words, the processing unit 310 cannot select two or more detailed measures for one ECM.

At step 421, the processing unit 310 may select detailed measures of one or more ECMs based on the cost limitation.

At step 431, the processing unit 310 may select detailed measures of one or more ECMs in response to the user's selection.

The processing unit 310 may identify, for each of multiple ECMs, one detailed measure selected by the user from among one or more detailed measures of the corresponding ECM.

At step 441, the processing unit 310 may select detailed measures of one or more ECMs based on the required energy savings.

At steps 422, 432 and 442, the output unit 140 or the UI output device 360 may output the results of analysis of the detailed measures of the one or more ECMs.

At step 422, the output unit 140 or the UI output device 360 may output the results of analysis of the detailed measures of the one or more ECMs, which are selected depending on the cost-based ECM determination scheme.

The results of the analysis may include 1) costs estimation based on the detailed measures of the selected one or more ECMs, 2) a list of one or more ECMs and the detailed measures of the one or more ECMs, and 3) energy savings estimation based on the detailed measures of the selected one or more ECMs.

At step 432, the output unit 140 or the UI output device 360 may output the results of analysis of the detailed measures of one or more ECMs, which are selected depending on the user ECM determination scheme.

The results of the analysis may include 1) costs estimation based on the detailed measures of the selected one or more ECMs, 2) a list of one or more ECMs and the detailed measures of the one or more ECMs, and 3) energy savings estimation based on the detailed measures of the selected one or more ECMs.

At step 442, the output unit 140 or the UI output device 360 may output the results of analysis of the detailed measures of the one or more ECMs, which are selected depending on the energy savings-based ECM determination scheme. The results of analysis may represent the effects of improvement resulting from the selected ECMs and the selected detailed measures of the ECMs.

The results of the analysis may include 1) energy savings, estimation based on the detailed measures of the selected one or more ECMs, 2) a list of one or more ECMs and the detailed measures of the one or more ECMs, and 3) costs estimation based on the detailed measures of the selected one or more ECMs.

In an embodiment, an allowable range s may be applied to the cost limitation. When the allowable range is applied to the cost limitation, the processing unit 310 may select detailed measures of one or more ECMs within the cost limitation and within the allowable range.

A combination of ECMs may be selected, as given by the following Equations (1) and (2).

$$\text{Maximizes} \sum_{i=1}^{m} s_i \quad (1)$$

$$\text{Subject to} \sum_{i=1}^{m} c_i \leq B \quad (2)$$

Here, m may denote the number of selected ECMs. $c_i$ may be the cost of ECM i. $s_i$ may be the energy savings of ECM i. The costs of ECMs may be different from each other, and the savings of ECMs may be different from each other. B may be the cost limitation.

Equation (1) may indicate that the sum of energy savings of m selected ECMs is maximized.

Equation (2) may indicate that the sum of the costs of m selected ECMs must be less than or equal to the cost limitation B.

The selected ECMs may be the combinations of m ECMs that can maximize overall energy savings while the total cost thereof does not exceed the cost limitation B among ECMs having different costs and different savings.

When the number of available ECMs that can be the targets to be selected may be m, and, for each of the m available ECMs, there are only two types of options, namely selection of the corresponding ECM and non-selection of the ECM, for example, when only one detailed measure is present for one ECM, the number of combinations of selected ECMs may be $2^m$. Therefore, as the value of m increases, the complexity of calculation may also rapidly increase.

Further, when the number of available ECMs is m and the number of detailed measures of ECM i is $n_i$, the number of combinations of the selected ECMs and the selected detailed measures of the selected ECMs may be the multiplication of the numbers of detailed measures of the m ECMs, as given in the following Equation (3):

$$\prod_{i=1}^{m} n_i \quad (3)$$

If the combinations of ECMs are merely searched for without taking into consideration the detailed measures, the search for these combinations may be implemented using a knapsack algorithm that uses Dynamic Programming (DP).

However, in the following embodiments, a maximum of one detailed measure must be selected from among multiple detailed measures for implementing an ECM. Therefore, required is a function that prevents two or more detailed measures from being duplicately selected for a single ECM and enables a more suitable detailed measure to be selected so that, even if a detailed measure has been previously selected for the corresponding ECM, the previously selected detailed measure is replaced with the more suitable detailed measure.

Figure 5:
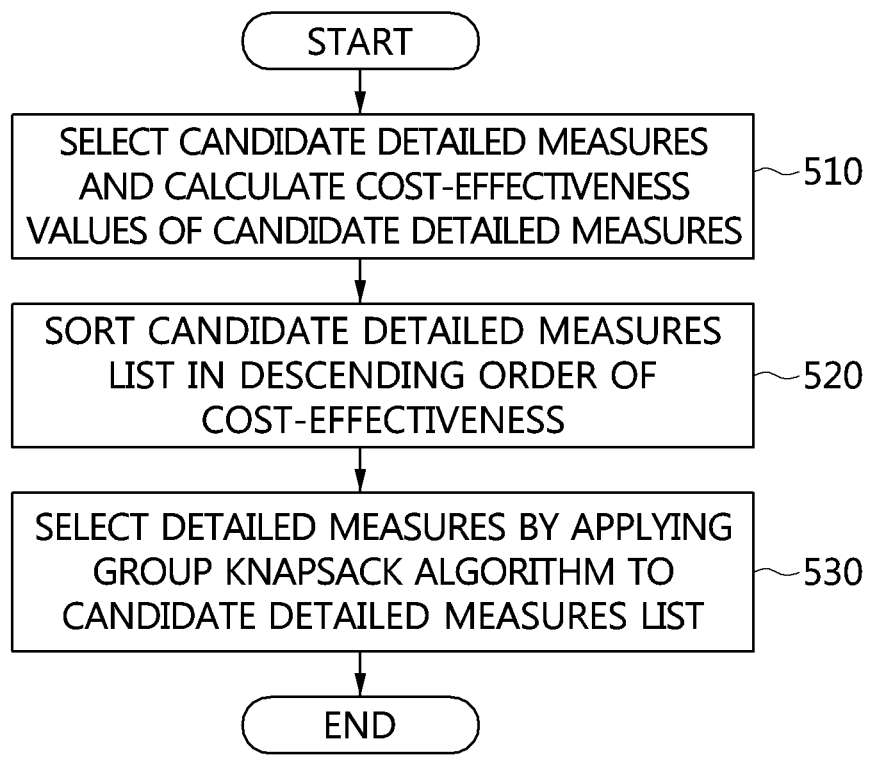
FIG. 5 is a flowchart illustrating a cost-based ECM selection scheme according to an embodiment.

FIG. 5 is a flowchart of a cost-based ECM determination scheme according to an embodiment.

Step 421, described above with reference to FIG. 4, may include the following steps 510, 520, and 530.

At step 510, the processing unit 310 may select one or more candidate detailed measures from among all available detailed measures, and may calculate the cost-effectiveness values of the selected one or more detailed measures.

The processing unit 310 may generate a candidate detailed measure list L for the selected one or more detailed measures.

The entities of the candidate detailed measure list L may include 1) detailed measure $d_{i,j}$, 2) cost $c_{i,j}$ corresponding to $d_{i,j}$, 3) energy savings $s_{i,j}$ corresponding to $d_{i,j}$, and 4) cost-effectiveness $\eta_{i,j}$ of $d_{i,j}$.

At step 520, the processing unit 310 may sort the entities of the list L in descending order of cost-effectiveness.

At step 530, the processing unit 310 may select detailed measures of one or more ECMs from among the candidate detailed measures by applying a group knapsack algorithm to the list L, sorted in descending order of cost-effectiveness.

The description of the cost-based ECM determination scheme in the above-described embodiment may also be changeably applied to the energy savings-based ECM determination scheme. That is, the above description may be changeably applied to the energy savings-based ECM determination scheme in such a way that cost-related details are changed to energy savings-related details, and energy savings-related details are changed to cost-related details.

Figure 6:
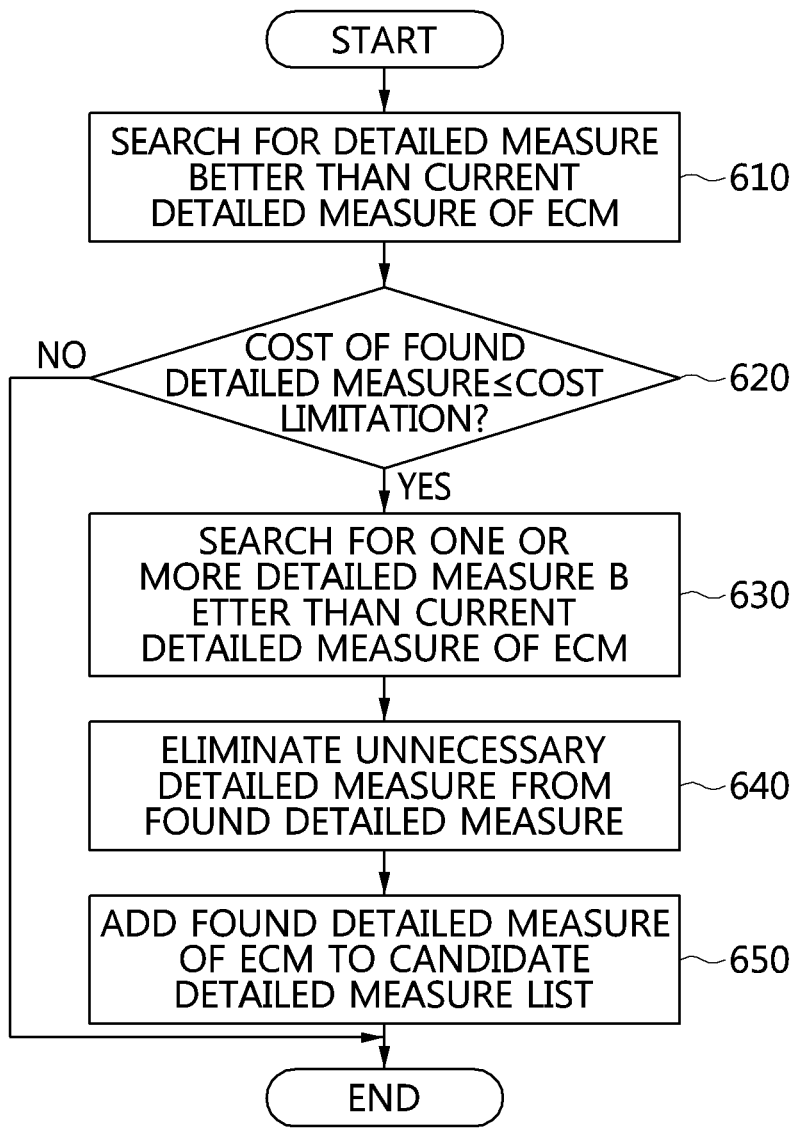
FIG. 6 is a flowchart illustrating a method for selecting candidate detailed measures and calculating the cost-effectiveness of the selected candidate detailed measures according to an embodiment.

FIG. 6 is a is a flowchart of a method for selecting candidate detailed measures and calculating the cost-effectiveness values of the selected candidate detailed measures according to an embodiment.

Step 510, described above with reference to FIG. 5, may include the following steps 610, 620, 630, 640, and 650.

At step 610, for each of all ECMs, the processing unit 310 may search for a detailed measure that is better than the current detailed measure of the corresponding ECM.

The detailed measure that is better than the current detailed measure may be a detailed measure having energy savings higher than the energy savings of the current detailed measure.

At step 620, the processing unit 310 may check whether the cost of the found detailed measure of the ECM is less than or equal to the cost limitation. The fact that the cost of the found detailed measure is less than or equal to the cost limitation may mean that the found detailed measure may be installed within the imposed cost limitation.

If the cost of the found detailed measure is less than or equal to the cost limitation, the processing unit 310 may search the remaining detailed measures of the ECM for additional detailed measures that are better than the current detailed measure.

At the above-described steps 610 and 620, for each of all ECMs, the processing unit 310 may search for one or more detailed measures that are better than the current detailed measure of the corresponding ECM.

At step 630, the processing unit 310 may eliminate an unnecessary detailed measure from the found one or more detailed measures.

The unnecessary detailed measure may be a detailed measure which has a cost equal to or greater than those of one or more remaining detailed measures and which has energy savings less than or equal to those of the one or more remaining detailed measures.

The processing unit 310 may eliminate a detailed measure that has a cost equal to or greater than those of the one or more remaining detailed measures and has energy savings less than or equal to those of the one or more remaining detailed measures from the found one or more detailed measures.

A target detailed measure may be a detailed measure which is checked as to whether it is to be eliminated from the found one or more detailed measures.

If the costs of the found one or more detailed measures of the ECM are sorted in ascending order of cost, the processing unit 310 may determine whether to eliminate the target detailed measure by comparing the energy savings of the target detailed measure with the previous energy savings of the target detailed measure. For example, when the energy savings of the target detailed measure is less than or equal to the previous energy savings of the target detailed measure, the target detailed measure may be eliminated from the found one or more detailed measures.

At step 640, for each of all ECMs, the processing unit 310 may add the found one or more detailed measures of the corresponding ECM to the candidate detailed measure list L.

When the detailed measure $d_{i,j}$ of ECM i is found, the processing unit 310 may perform operation according to the following Equation (4):

$$L = L \cup \{d_{i,j}\} \quad (4)$$

For example, for ECM 1 of FIG. 2, one or more detailed measures, which are found as detailed measures better than the current detailed measure $d_{1,2}$, may be $d_{1,3}$, $d_{1,4}$, and $d_{1,5}$.

At step 650, the processing unit 310 may calculate the cost-effectiveness values of the one or more candidate detailed measures in the candidate detailed measure list L.

The cost-effectiveness $\eta_{i,j}$ of candidate detailed measure $d_{i,j}$ may be given by the following Equation (5):

$$\eta_{i,j} = \frac{s_{i,j}}{c_{i,j}} \quad (5)$$

The cost-effectiveness $\eta_{i,j}$ of the candidate detailed measure $d_{i,j}$ may be a value obtained by dividing the energy savings $s_{i,j}$ of $d_{i,j}$ by the cost $c_{i,j}$ of $d_{i,j}$.

According to step 520, described above with reference to FIG. 5, the one or more candidate detailed measures in the candidate detailed measure list L may be sorted in descending order of cost-effectiveness of the candidate detailed measures.

Figure 7:
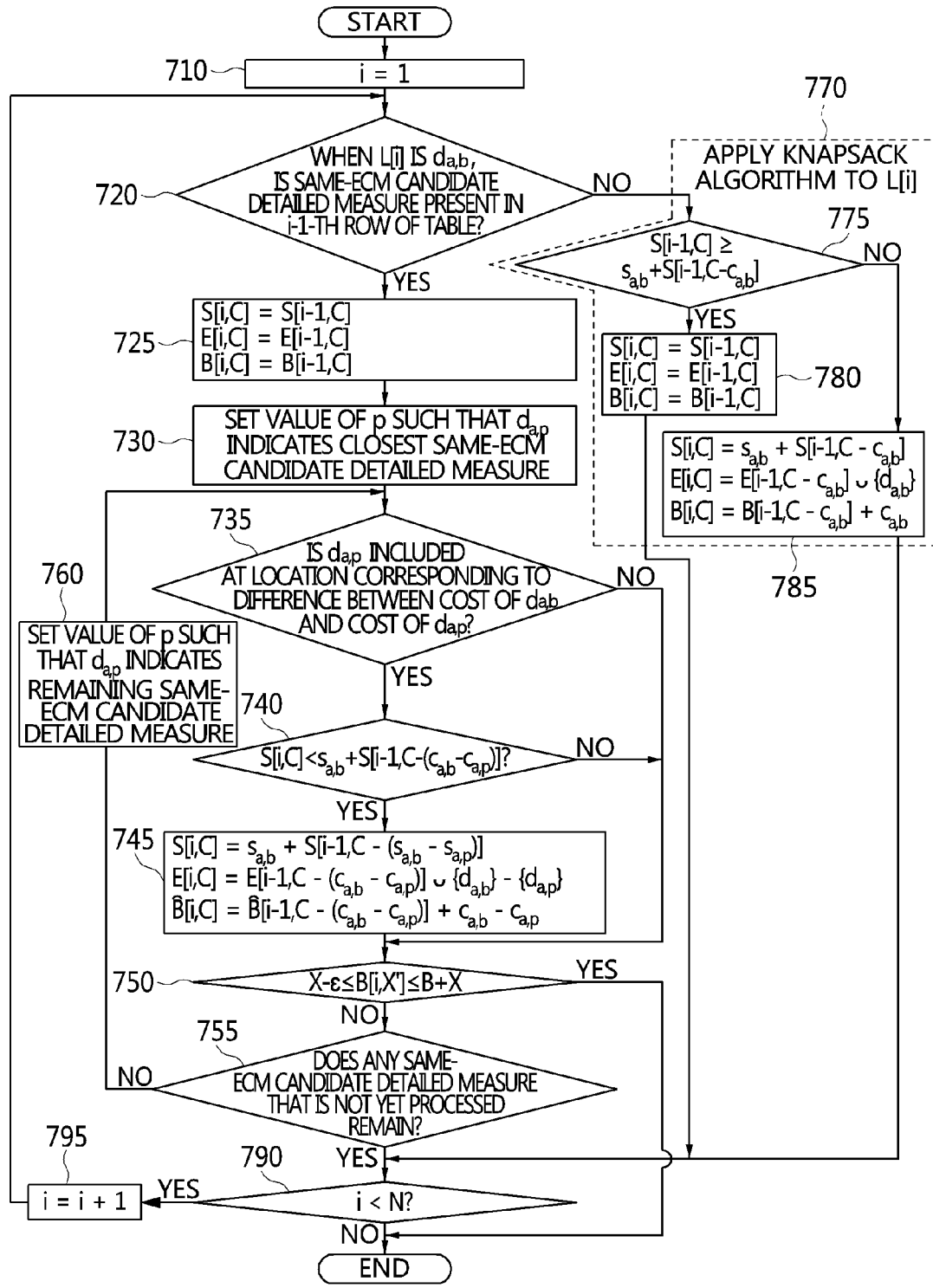
FIG. 7 is a flowchart illustrating a method for selecting detailed measures of multiple ECMs from among candidate detailed measures by applying a group knapsack algorithm to a list of candidate detailed measures according to an embodiment.

FIG. 7 is a flowchart illustrating a method for selecting detailed measures of multiple ECMs from among candidate detailed measures by applying a group knapsack algorithm to a candidate detailed measure list according to an embodiment.

The method according to the embodiment may configure a dynamic programming table for one or more candidate detailed measures which are sorted in descending order of cost-effectiveness. In other words, the processing unit 310 may configure a dynamic programming table for all of one or more candidate detailed measures which are sorted in descending order of cost-effectiveness, thus selecting detailed measures of one or more ECMs from among the candidate detailed measures.

The method by which the processing unit 310 configures the dynamic programming table may be one that is improved from a method by which a knapsack algorithm configures a dynamic table. The method by which the processing unit 310 configures the dynamic programming table may configure the dynamic programming table depending on the knapsack algorithm such that two or more of multiple candidate detailed measures of a same ECM are not included in one row of the table. The processing unit 310 may generate a row corresponding to a specific candidate detailed measure. An i-th candidate detailed measure may correspond to the i-th row of the table. Before adding the specific candidate detailed measure to the current row of the table, the processing unit 310 may determine whether a candidate detailed measure for the same or identical ECM (hereinafter also referred to as a "same-ECM candidate detailed measure") is present in the row previous to the current row. The same-ECM candidate detailed measure may be an additional candidate detailed measure that belongs to the ECM of the specific candidate detailed measure and that is other than the specific candidate detailed measure. In other words, the ECM of the specific candidate detailed measure and the ECM of the same-ECM candidate detailed measure may be same to each other. If the same-ECM candidate detailed measure is present in the previous row, the processing unit 310 may determine which one of the specific candidate detailed measure and the same-ECM candidate detailed measure is to be added to the current row.

Step S530, described above with reference to FIG. 5, may include the following steps 710, 720, 725, 730, 735, 740, 745, 750, 755, 760, 770, 775, 780, 785, 790, and 795.

Steps 710, 720, 725, 730, 735, 740, 745, 750, 755, 760, 770, 775, 780, 785, 790, and 795 may be applied to a candidate detailed measure list L.

At steps 710, 790 and 795, steps 720, 725, 730, 735, 740, 745, 750, 755, 760, 770, 775, 780, and 785 may be performed for L[i].

L[i] may be an i-th candidate detailed measure of the list L, where i may be a value that is equal to or greater than 1 and is less than or equal to N. N may be the number of candidate detailed measures in the list L.

As described above with reference to FIG. 5, the candidate detailed measures in the list L may be sorted in descending order of cost-effectiveness of the candidate detailed measures. For one or more candidate detailed measures in the list L, steps 720, 725, 730, 735, 740, 745, 750, 755, 760, 770, 775, 780, and 785 may be performed in descending order of cost-effectiveness of the one or more candidate detailed measures.

At steps 710, 720, 725, 730, 735, 740, 745, 750, 755, 760, 770, 775, 780, 785, 790, and 795, one row of the dynamic programming table may be generated.

The number of columns in the table may be X'+1, ranging from 0 to X'. The number of rows in the table may be N+1, ranging from 0 to N.

X may be a cost limitation. When an allowable range ε is not applied to the cost limitation, X' may be X. When the allowable range ε is applied to the cost limitation, X' may be X+ε.

S [i, C] may be a value in a C-th column in the i-th row of the table. Here, i may indicate that candidate detailed measures ranging from a first candidate detailed measure to an i-th candidate detailed measure in the list L may be the target to be selected. In other words, the i-th row of the table may be generated for the first to i-th candidate detailed measures of the list L.

C may denote cost.

S [i, C] may be the sum of energy efficiency values of candidate detailed measures selected from among the first to i-th candidate detailed measures. Here, the sum of energy efficiency values of the selected candidate detailed measures may be limited such that it is less than or equal to C. The processing unit 310 may select candidate detailed measures from among the first to i-th candidate detailed measures so that the sum of energy efficiency values of the selected candidate detailed measures is maximized and the sum of the costs of the selected candidate detailed measures does not exceed C.

E [i, C] may be a set of selected candidate detailed measures of S [i, C].

B[i, C] may be the sum of the costs of the selected candidate detailed measures of S[i, C].

At step 710, the processing unit 310 may set the value of i to 1.

Further, the processing unit 310 may set the value of S[0, C] to 0 for C falling within the range from 0 to X' (i.e. C is equal to or greater than 0 and is less than or equal to X'), may set E[0, C] to a null set, and may set the value of B[0, C] to 0. These settings may indicate that, for the 0-th row of the table, none of the candidate detailed measures in the list L are taken into consideration.

L[i] may be an i-th candidate detailed measure, among the candidate detailed measures in the list L. $d_{a,b}$ may denote L[i]. In other words, in the following description, L[i] will be described as being a b-th detailed measure of ECM a.

The i-th row of the table may be the current row corresponding to L[i], which is the target to be processed. The i−1-th row of the table may be a row previous to the current row.

At step 720, the processing unit 310 may check whether an same-ECM candidate detailed measure is present in the i−1-th row of the table.

The same-ECM candidate detailed measure may be a candidate detailed measure that belongs to the ECM of $d_{a,b}$ and is other than $d_{a,b}$. In other words, the same-ECM candidate detailed measure may be $d_{a,p}$, and p may be different from b.

The fact that the same-ECM candidate detailed measure is present in the i−1-th row of the table may mean that, for C ranging from 0 to X', at least one E[i, C] includes the same-ECM candidate detailed measure.

The ECM of the same-ECM candidate detailed measure may be 'a'. That is, the same-ECM candidate detailed measure may be a candidate detailed measure, the ECM of which is 'a'.

The same-ECM candidate detailed measure may be a candidate detailed measure previous to $d_{a,b}$. Further, due to the scheme for sorting the list L and generating the table, the candidate detailed measure previous to $d_{a,b}$ may be located prior to $d_{a,b}$ in the list L.

When the same-ECM candidate detailed measure is present, $d_{a,b}$ in the table must be able to be replaced with the same-ECM candidate detailed measure. When the same-ECM candidate detailed measure is present, step 725 may be performed.

When there is no same-ECM candidate detailed measure, a knapsack algorithm may be applied to $d_{a,b}$. When there is no same-ECM candidate detailed measure, step 770 may be performed. That is, when there is no same-ECM candidate detailed measure, the processing unit 310 may determine whether to include $d_{a,b}$ in the current row by applying a knapsack algorithm to $d_{a,b}$.

At step 725, the processing unit 310 may set a temporary value for the i-th row of the table.

The processing unit 310 may set the temporary value for the i-th row of the table using the following Equations (6), (7), and (8):

$$V[i,C]=V[i-1,C] \quad (6)$$

$$E[i,C]=E[i-1,C] \quad (7)$$

$$B[i,C]=B[i-1,C] \quad (8)$$

As described in Equations (6), (7), and (8), the processing unit 310 may set the i-th row of the table to a value same to the i−1-th row of the table.

At step 730, the processing unit 310 may set the value of p.

The number of same-ECM candidate detailed measures may be one or more. The processing unit 310 may set the value of p so that p indicates an same-ECM candidate detailed measure, which is previous to $d_{a,b}$ and is closest to $d_{a,b}$ in the list L, among the one or more same-ECM candidate detailed measures.

That is, $d_{a,p}$ may be an same-ECM candidate detailed measure, which is previous to $d_{a,b}$ and is closest to $d_{a,b}$ in the list L, among the one or more same-ECM candidate detailed measures.

For C ranging from 0 to X', the following steps 735, 740, and 745 may be performed.

At step 735, the processing unit 310 may check whether $d_{a,p}$ is included at the location corresponding to the difference between the cost of $d_{a,b}$ and the cost of $d_{a,p}$ in the i−1-th row.

Here, the location corresponding to the difference between the cost of $d_{a,b}$ and the cost of $d_{a,p}$ may indicate a $C-(c_{a,b}-c_{a,p})$-th column in the i−1-th row of the table.

The fact that $d_{a,p}$ is included at the location corresponding to the difference between the cost of $d_{a,b}$ and the cost of $d_{a,p}$ may mean that $E[i-1, C-(c_{a,b}-c_{a,p})]$ includes $d_{a,p}$. The fact that $d_{a,p}$ is not included at the location corresponding to the difference between the cost of $d_{a,b}$ and the cost of $d_{a,p}$ may mean that $E[i-1, C-(c_{a,b}-c_{a,p})]$ does not include $d_{a,p}$.

When $d_{a,p}$ is included at the location corresponding to the difference between the cost of $d_{a,b}$ and the cost of $d_{a,p}$, step 740 may be performed.

When $d_{a,p}$ is not included at the location corresponding to the difference between the cost of $d_{a,b}$ and the cost of $d_{a,p}$, step 750 may be performed to process a subsequent additional same-ECM candidate detailed measure.

At step 740, the processing unit 310 may determine whether energy savings is improved when $d_{a,p}$ is replaced with $d_{a,b}$.

If energy savings is improved when $d_{a,p}$ is replaced with $d_{a,b}$, step 745 may be performed.

If energy savings is not improved when $d_{a,p}$ is replaced with $d_{a,b}$, step 750 may be performed.

Whether energy savings is improved may be determined by the following Equation (9):

$$S[i,C]<s_{a,b}+S[i-1,C-(c_{a,b}-c_{a,p})] \quad (9)$$

When Equation (9) is satisfied, energy savings may be improved by replacing $d_{a,p}$ with $d_{a,b}$. Therefore, when Equation (9) is satisfied, step 745 may be performed.

When Equation (9) is not satisfied, energy savings may not be improved by replacing $d_{a,p}$ with $d_{a,b}$. Therefore, when Equation (9) is not satisfied, step 750 may be performed.

At step 745, the processing unit 310 may replace $d_{a,p}$ with $d_{a,b}$ for the i-th row in which the temporary value is set.

In other words, the processing unit 310 may add $d_{a,b}$ to the i-th row if $d_{a,p}$ is included at the location corresponding to the difference between the cost of $d_{a,b}$ and the cost of $d_{a,p}$, and energy savings is improved when $d_{a,p}$ is replaced with $d_{a,b}$.

Here, replacing $d_{a,p}$ with $d_{a,b}$ for the i-th row may mean that, as $d_{a,p}$ in the i−1-th row is excluded from the i-th row, and $d_{a,b}$ is added to the i-th row, the values of S, E, and B are set.

The processing unit 310 may replace $d_{a,p}$ with $d_{a,b}$ for the i-th row of the table depending on the following Equations (10), (11), and (12):

$$S[i,C] = s_{a,b} + S[i-1, C-(c_{a,b}-c_{a,p})] \quad (10)$$

$$E[i,C] = E[i-1, C-(c_{a,b}-c_{a,p})] \cup \{d_{a,b}\} - \{d_{a,p}\} \quad (11)$$

$$B[i,C] = B[i-1, C-c_{a,b}] + c_{a,b} - c_{a,p} \quad (12)$$

According to the description of Equations (10), (11), and (12), the processing unit 310 may set values for the i-th row of the table.

Depending on Equations (10), (11), and (12), the values of S, E and B may be set in accordance with the state in which $d_{a,p}$ is excluded from the i-th row and $d_{a,b}$ is added to the i-th row in which the temporary value is set.

The setting of S at steps 735, 740 and 745 may be represented by the following Equation (13):

$$S[i,C] = \max(S[i-1,C], s_i + S[i-1, C-(c_{a,b}-c_{a,p})]) \quad (13)$$

At step 750, the processing unit 310 may determine whether to finally select the candidate detailed measures included in the current i-th row as multiple detailed measures of one or more ECMs for the cost limitation at step 530.

The processing unit 310 may finally select the candidate detailed measures included in the current i-th row as the multiple detailed measures of one or more ECMs for the cost limitation if the candidate detailed measures included in the current i-th row are optimal detailed measures for the cost limitation.

The processing unit 310 may determine whether to finally select the candidate detailed measures included in the current i-th row as the multiple detailed measures of the one or more ECMs for the cost limitation based on the following Equation (14):

$$X - \varepsilon \leq B[i, X'] \leq X + \varepsilon \quad (14)$$

According to Equation (14), the processing unit 310 may finally select the candidate detailed measures included in the current i-th row of the table as multiple detailed measures of one or more ECMs for the cost limitation if the cost B[i, X'] of the last column in the i-th row of the table falls within the range from [X-ε] to [X+ε].

According to Equation (14), the processing unit 310 may not finally select the candidate detailed measures included in the current i-th row of the table as multiple detailed measures of one or more ECMs for the cost limitation if the cost B[i, x'] of the last column in the i-th row of the table falls out of the range from [X-ε] to [X+ε].

Alternatively, the processing unit 310 may finally select the candidate detailed measures included in the current i-th row of the table as multiple detailed measures of one or more ECMs for the cost limitation if the sum of costs of the candidate detailed measures included in the i-th row of the table falls within the range from [X-ε] to [X+ε].

When an error range is not given, the processing unit 310 may finally select the candidate detailed measures included in the current i-th row of the table as multiple detailed measures of the one or more ECMs for the cost limitation if the cost B[i,X'] of the last column in the i-th row of the table is same to the cost limitation X.

When an error range is not given, the processing unit 310 may not select the candidate detailed measures included in the current i-th row of the table as multiple detailed measures of the one or more ECMs for the cost limitation according to Equation (14) if the cost B[i,X'] of the last column in the i-th row of the table is not same to the cost limitation X.

Alternatively, the processing unit 310 may finally select the candidate detailed measures included in the current i-th row of the table as multiple detailed measures of one or more ECMs for the cost limitation if the sum of the costs of the candidate detailed measures included in the i-th row of the table is same to the cost limitation X.

When the candidate detailed measures included in the current i-th row are finally selected as multiple detailed measures of one or more ECMs for the cost limitation, the procedure may be terminated.

When the candidate detailed measures included in the current i-th row are not finally selected as multiple detailed measures of one or more ECMs for the cost limitation, step 755 may be performed.

At step 755, the processing unit 310 may check whether any same-ECM candidate detailed measure that is not yet processed remains among one or more same-ECM candidate detailed measures.

If any same-ECM candidate detailed measure that is not yet processed remains among one or more same-ECM candidate detailed measures, step 760 may be performed to process the remaining same-ECM candidate detailed measure.

If any same-ECM candidate that is not processed yet does not remain among one or more same-ECM candidate detailed measures, step 790 may be performed so as to process a subsequent row.

At step 760, the processing unit 310 may set the value of p.

The processing unit 310 may set the value of p so that $d_{a,p}$ indicates an same-ECM candidate detailed measure subsequent to the current same-ECM candidate detailed measure.

Here, the subsequent same-ECM candidate detailed measure may be the same-ECM candidate detailed measure that is previous to the current same-ECM candidate detailed measure and is closest to the current same-ECM candidate detailed measure in the list L, among one or more same-ECM candidate detailed measures.

In other words, at steps 730, 755 and 760, the one or more same-ECM candidate detailed measures of $d_{a,b}$ may be the targets to be compared with $d_{a,b}$ in reverse order relative to the order of the detailed measures in the list L.

At step 770, the processing unit 310 may apply a knapsack algorithm to L[i] in the i–1-th row of the table.

Step 770 may include steps 775, 780, and 785.

For C ranging from 0 to X', steps 775, 780, and 785 may be performed.

At step 775, the processing unit 310 may determine whether $d_{a,b}$ is suitable for addition to the location corresponding to a C-th column in the i-th row.

If it is determined that $d_{a,b}$ is suitable for addition to the location corresponding to the C-th column in the i-th row, step 785 may be performed. If it is determined that $d_{a,b}$ is not suitable for addition to the location corresponding to the C-th column in the i-th row, step 780 may be performed.

The processing unit 310 may determine whether $d_{a,b}$ is suitable for addition to the location corresponding to the C-th column in the i-th row based on the following Equation (15):

$$S[i-1, C] \geq s_{a,b} + S[i-1, C-c_{a,b}] \quad (15)$$

If the result of Equation (15) is not true, $d_{a,b}$ may be added to the location corresponding to the C-th column in the i-th row of the table. Therefore, if the result of Equation (15) is not true, step 785 may be performed.

If the result of Equation (15) is true, $d_{a,b}$ may not be added to the location corresponding to the C-th column in the i-th row of the table. Therefore, if the result of Equation (15) is true, step 780 may be performed.

At step 780, the processing unit 310 may set the value of the location corresponding to the C-th column in the i-th row of the table.

The processing unit 310 may set the value of the location corresponding to the C-th column in the i-th row of the table using the following Equations (16), (17), and (18).

$$V[i,C]=V[i-1,C] \quad (16)$$

$$E[i,C]=E[i-1,C] \quad (17)$$

$$B[i,C]=B[i-1,C] \quad (18)$$

The processing unit 310 may set the value of the location corresponding to the C-th column in the i-th row of the table using the value of a location corresponding to the C-th column in the i−1-th row of the table.

At step 785, the processing unit 310 may set the value of the location corresponding to the C-th column in the i-th row of the table.

The processing unit 310 may set the value of the location corresponding to the C-th column in the i-th row of the table using the following Equations (19), (20), and (21):

$$S[i,C]=s_{a,b}+S[i-1,C-c_{a,b}] \quad (19)$$

$$E[i,C]=E[i-1,C-c_{a,b}]\cup\{d_{a,b}\} \quad (20)$$

$$B[i,C]=B[i-1,C-c_{a,b}]+c_{a,b} \quad (21)$$

The processing unit 310 may set the value of the location corresponding to the C-th column in the i-th row of the table using the value of the location corresponding to the $C-c_{a,b}$-th column in the i−1-th row of the table.

The setting of S[i, C] at steps 775, 780 and 785 may also be represented by the following Equation (22):

$$S[i,C]=\max(S[i-1,C],s_{a,b}+S[i-1,C-c_{a,b}]) \quad (22)$$

At step 790, the processing unit 310 may determine whether any candidate detailed measure that is not yet processed remains among the candidate detailed measures in the list L.

When i is less than N, step 795 may be performed.

When i is not less than N, the procedure may be terminated.

At step 795, the processing unit 310 may increase the value of i by 1. As the value of i has increased by 1, a candidate detailed measure subsequent to the current candidate detailed measure may be the target to be processed.

At steps 710, 790 and 795, the rows of the dynamic programming table may be generated for all candidate detailed measures of the list L.

The apparatus described herein may be implemented using hardware components, software components, or a combination thereof. For example, the apparatus and components described in the embodiments may be implemented using one or more general-purpose or special-purpose computers, for example, a processor, a controller, an arithmetic logic unit (ALU), a digital signal processor, a microcomputer, a field programmable array (FPA), a programmable logic unit (PLU), a microprocessor or any other apparatus (device) capable of responding to and executing instructions. A processing device may run an operating system (OS) and one or more software applications that run on the OS.

The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, are possible.

The software may include a computer program, code, instructions, or some combination thereof, and it is possible to configure processing devices or to independently or collectively instruct the processing devices to operate as desired. Software and data may be embodied permanently or temporarily in any type of machine, component, physical or virtual equipment, computer storage medium, or device, or in a propagated signal wave in order to provide instructions or data to the processing devices or to be interpreted by the processing devices. The software may also be distributed in computer systems over a network such that the software is stored and executed in a distributed manner. In particular, the software and data may be stored in one or more computer-readable recording media.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk CD-ROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

Provided are an apparatus and method for determining ECMs so that energy savings is maximized within the range of costs presented to retrofit a building.

Provided are an apparatus and method for determining ECMs so that costs are minimized while energy savings required in order to retrofit a building are satisfied.

Provided are an apparatus and method for analyzing cost reduction and energy saving effects resulting from determined ECMs.

Provided are an apparatus and method for solving a problem in that the number of combinations of multiple ECMs is excessively large.

Provided are an apparatus and method for determining an optimal combination, among various possible combinations of ECMs.

Provided are an apparatus and method for providing the reduction of energy consumption, the reduction of energy costs of a building, and the reduction of $CO_2$ emissions by selecting ECMs.

Provided are an apparatus and method for providing information, such as a list of selected ECMs, initial installation costs of the selected ECMs, energy savings by the selected ECMs, and a payback period for costs attributable to the selected ECMs.

Provided are an apparatus and method for facilitating measuring, design and management of building retrofit by providing information.

Provided are an apparatus and method for determining an optimized combination of items separated into groups.

Although the embodiments of the present invention have been disclosed for illustrative purposes, those skilled in the art will appreciate that various modifications, additions and substitutions are possible, without departing from the scope and spirit of the invention. For example, if the described techniques are performed in a different order, if the described components, such as systems, architectures, devices, and circuits, are combined or coupled with other components by a method different from the described methods, or if the described components are replaced with other components or equivalents, the results are still to be understood as falling within the scope of the present invention.

What is claimed is:

1. An analysis apparatus, comprising:
a transceiver for receiving a condition for building retrofit; and
at least one processor for selecting detailed measures of one or more Energy Conservation Measures (ECMs) for a building based on the condition,
wherein, each of the one or more ECMs, the at least one processor selects a maximum of one detailed measure from among multiple detailed measures of the corresponding ECM,
wherein, the at least one processor selects the detailed measures of the one or more ECMs depending on a cost-based ECM determination scheme,
the condition is the cost limitation, and
the cost-based ECM determination scheme is a scheme for allowing the at least one processor to select the detailed measures of the one or more ECMs such that the cost limitation is not exceeded,
wherein the at least one processor selects one or more candidate detailed measures from among all available detailed measures, generates a candidate detailed measure list for the one or more candidate detailed measures, and selects the detailed measures of the one or more ECMs from among the one or more candidate detailed measures by applying a group knapsack algorithm to the candidate detailed measure list.

2. The analysis apparatus of claim 1, wherein the at least one processor selects one of multiple ECM determination schemes, and selects the detailed measures of the one or more ECMs depending on the selected ECM determination scheme.

3. The analysis apparatus of claim 1, wherein the transceiver outputs results of analysis of the detailed measures of the one or more ECMs,
wherein the results of the analysis comprises costs estimation based on the selected detailed measures of the one or more ECMs, a list of the detailed measures of the one or more ECMs, and energy savings estimation based on the selected detailed measures of the one or more ECMs.

4. The analysis apparatus of claim 1, wherein:
the at least one processor selects the detailed measures of the one or more ECMs depending on a user ECM determination scheme, and
the user ECM determination scheme is a scheme for allowing a user of the analysis apparatus to select the detailed measures of the one or more ECMs.

5. The analysis apparatus of claim 1, wherein:
the at least one processor selects the detailed measures of the one or more ECMs depending on an energy savings-based ECM determination scheme,
the condition is required energy savings, and
the energy savings-based ECM determination scheme is a scheme for allowing the at least one processor to select the detailed measures of the one or more ECMs such that the required energy savings is satisfied.

6. The analysis apparatus of claim 1 wherein:
an allowable range is applied to the cost limitation, and
the at least one processor selects the detailed measures of the one or more ECMs within the allowable range of the cost limitation.

7. The analysis apparatus of claim 1, wherein the at least one processor calculates cost-effectiveness values of the one or more candidate detailed measures, and sorts entities in the candidate detailed measure list in descending order of cost-effectiveness.

8. The analysis apparatus of claim 1, wherein:
the at least one processor is configured to, for each of all ECMs, search for a detailed measure having energy savings higher than an energy savings of a current detailed measure of the corresponding ECM, and
the at least one processor adds the found detailed measure to the candidate detailed measure list if a cost of the found detailed measure is less than or equal to the cost limitation.

9. The analysis apparatus of claim 8, wherein:
the found detailed measure comprises one or more detailed measures, and
the at least one processor eliminates, from the one or more detailed measures, a detailed measure that has a cost equal to or greater than those of remaining detailed measures and has an energy savings less than or equal to those of the remaining detailed measures.

10. The analysis apparatus of claim 1, wherein the at least one processor configures a dynamic programming table for the one or more candidate detailed measures which are sorted in descending order of cost-effectiveness, thus selecting the detailed measures of the one or more ECMs from among the one or more candidate detailed measures.

11. The analysis apparatus of claim 10, wherein the table is configured using a method based on a knapsack algorithm, the method being configured such that two or more of multiple candidate detailed measures of an same ECM are not included in one row of the table.

12. The analysis apparatus of claim 10, wherein:
the at least one processor is configured to, before adding a certain candidate detailed measure to a current row of the table, check whether an same-ECM candidate detailed measure is present in a row previous to the current row, and determine which one of the certain candidate detailed measure and the same-ECM candidate detailed measure is to be added to the current row if the same-ECM candidate detailed measure is found to be present in the previous row, and
an ECM of the same-ECM candidate detailed measure is same to an ECM of the certain candidate detailed measure.

13. The analysis apparatus of claim 12, wherein if the same-ECM candidate detailed measure is found to be present, the at least one processor determines whether to include the certain candidate detailed measure in the current row by applying a knapsack algorithm to the certain candidate detailed measure.

14. The analysis apparatus of claim 12, wherein the at least one processor adds the certain candidate detailed measure to the current row if the same-ECM candidate detailed measure is included at a location, corresponding to a difference between a cost of the certain candidate detailed measure and a cost of the same-ECM candidate detailed measure, in the previous row and if energy savings is improved when the same-ECM candidate detailed measure is replaced with the certain candidate detailed measure.

15. The analysis apparatus of claim 12, wherein the at least one processor determines candidate detailed measures included in the current row to be the detailed measures of the one or more ECMs if a sum of costs of candidate detailed measures included in the current row is same to the cost limitation.

16. The analysis apparatus of claim 12, wherein:
the same-ECM candidate detailed measure comprises one or more same-ECM candidate detailed measures, and
the one or more same-ECM candidate detailed measures are targets to be compared with the certain candidate detailed measure in reverse order relative to an order of candidate detailed measures in the candidate detailed measure list.

17. An analysis method, comprising:
receiving a cost limitation for building retrofit; and
selecting detailed measures of one or more Energy Conservation Measures (ECMs) for a building based on the cost limitation,
wherein, for each of the one or more ECMs, a maximum of one detailed measure is selected from among multiple detailed measures of the corresponding ECM,
selecting the detailed measures of the one or more ECMs depending on a cost-based ECM determination scheme,
the condition is the cost limitation, and
the cost-based ECM determination scheme is a scheme for allowing the selection of the detailed measures of the one or more ECMs such that the cost limitation is not exceeded,
selecting one or more candidate detailed measures from among all available detailed measures,
generating a candidate detailed measure list for the one or more candidate detailed measures,
and selecting the detailed measures of the one or more ECMs from among the one or more candidate detailed measures by applying a group knapsack algorithm to the candidate detailed measure list.

18. An analysis method, comprising:
receiving required energy savings for building retrofit; and
selecting detailed measures of one or more Energy Conservation Measures (ECMs) for a building based on the required energy savings,
wherein, for each of the one or more ECMs, a maximum of one detailed measure is selected from among multiple detailed measures of the corresponding ECM,
selecting the detailed measures of the one or more ECMs depending on a cost-based ECM determination scheme,
the condition is the required energy savings, and
the cost-based ECM determination scheme is a scheme for allowing the selection of the detailed measures of the one or more ECMs such that the required energy savings is not exceeded,
selecting one or more candidate detailed measures from among all available detailed measures,
generating a candidate detailed measure list for the one or more candidate detailed measures,
and selecting the detailed measures of the one or more ECMs from among the one or more candidate detailed measures by applying a group knapsack algorithm to the candidate detailed measure list.

* * * * *